L. O. PILLSBURY.
QUICK DETACHABLE MUD PULLER.
APPLICATION FILED APR. 16, 1912.

1,165,442.

Patented Dec. 28, 1915.

WITNESSES
Fenton S. Belt
Chr. A. Nielsen

INVENTOR
L. O. Pillsbury
By H. S. Woodward
Attorney

UNITED STATES PATENT OFFICE.

LEONARD O. PILLSBURY, OF CROCKER, SOUTH DAKOTA.

QUICK-DETACHABLE MUD-PULLER.

1,165,442. Specification of Letters Patent. Patented Dec. 28, 1915.

Application filed April 16, 1912. Serial No. 691,249.

*To all whom it may concern:*

Be it known that I, LEONARD OLIN PILLSBURY, a citizen of the United States, residing at Crocker, in the county of Clark and State of South Dakota, have invented new and useful Improvements in Quick-Detachable Mud-Pullers, of which the following is a specification.

This invention relates to devices for use on auto-vehicles for the application of great draft force in extricating them from mud holes, or other situations in which the ordinary tractive power of the machine is insufficient. It operates on the principle of the windlass various forms of which are familiar in such applications, and has for its object to provide a windlass hub adapted for use on artillery or other similar wheels of ordinary construction without material modification of structure, certain familiar elements in such wheels being adapted to coöperate with other parts in my invention to enable the hub to be put in place and removed rapidly, without the use of tools, and without disturbance of structural or mechanical elements on the wheel, and without the necessity of clamping elements, or other securing means requiring separate manipulation.

Other objects and advantages will be apparent from the following descriptions and from the drawings, in which—

Figure 1:
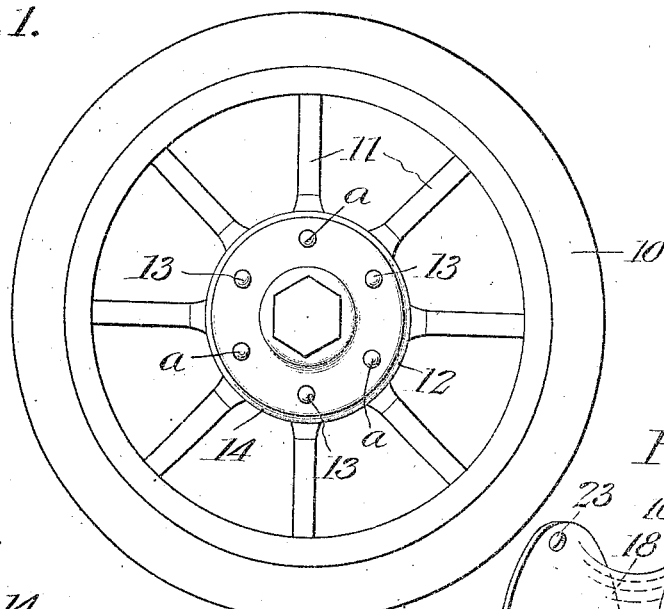
Figure 3:
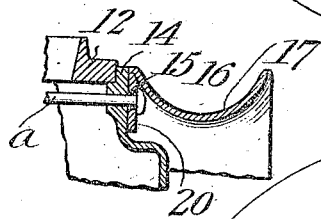
Figure 4:
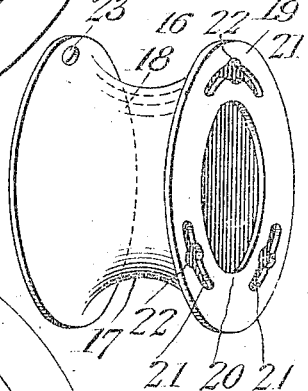
Figure 2:
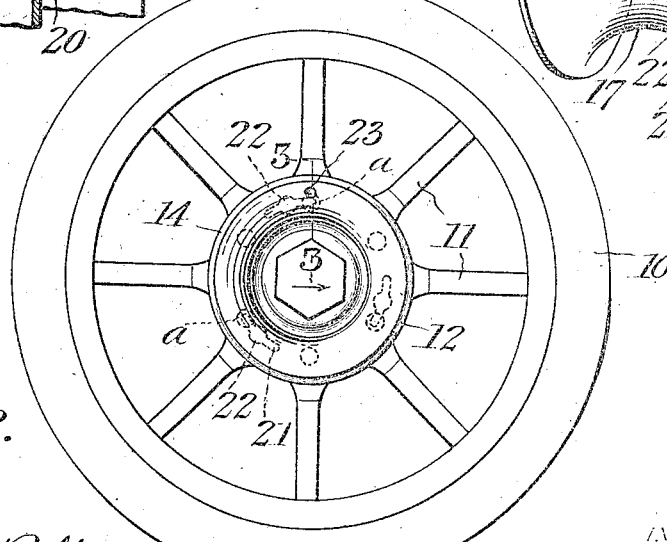

Figure 1 is a side view of a wheel adapted for the attachment of my hub, Fig. 2 is a vertical sectional view thereof, Fig. 3 is a side view of the wheel with my windlass hub in place, Fig. 4 is a perspective view of the hub detached.

There is illustrated a wheel including the usual rim 10, spokes 11, and any suitable hub construction 12, including the transverse bolts 13 securing the inner and outer hub flanges 14 in clamped engagement against the mortised spokes. Certain of these bolts, $a$, are slightly longer than those ordinarily employed in this situation, and held therearound between their heads and the adjacent outer flange 14 are small sleeves 15, the heads being sufficiently large to project outwardly of the sleeves. The bolts are tightened as usual so that the clamping of the flanges 14 is as firm as necessary.

My capstan hub comprises the head proper 16 or barrel having the usual concave channel 17 therearound for frictional binding of a rope or chain when coiled thereon, and the barrel may be provided or not with whelps as dotted at 18 whereby a more positive hold on a rope will be afforded. This barrel is well adapted to be pressed from sheet-metal, but may be cast if preferred, or formed in any other suitable manner. The barrel carries an annular head 19 attached or formed integrally therewith, projecting inwardly of the inner surface of the barrel as at 20 in the form of a plane flange, and spaced concentrically and equi-distantly therein there are curved concentric slots 21 having the central circular enlargements 22 adapted to receive the heads of the bolts $a$ freely therethrough, the slots being spaced to receive the bolts simultaneously through the enlargements and by relative rotation of the windlass hub the bolt-shanks and sleeves 15 are engaged in the reduced end portions of the slots in the direction opposite that of the rotary movement.

In use, the device is of course to be attached to the traction wheels, and for applying draft to a machine, the windlass hub is presented against the wheel until the bolt heads are projected through the slots, when the hub is turned slightly in a direction opposite to that in which the wheels are to turn in moving the vehicle, and the usual loops or turns of the draft cable made thereon. The driving mechanism being now operated, the rotation of the traction wheels may be utilized to wind up the draft cable, which through the agency of the usual block and tackle or other suitable equivalents may be made to draw the machine forward or backward out of a mire or ditch. The two-way slots in the head adapt the device to be securely retained upon the wheel under operation in either direction.

It will be apparent that the device is adapted to be manufactured at a low cost, and used with a minimum of difficulty, without the delays attendant on the use of clamps, yokes, or bolts and nuts, and without complications in adjustment in place upon the wheel. There are no loose parts to be lost and no special or other implements required for its application.

The barrel may be provided with a suitable aperture 23 in which the end of a draft cable or wire may be secured if desired, although the cable may be fed off the drum as taken up, as customary with windlass operation.

What is claimed is:

1. A device for pulling motor vehicles with a force in excess of their normal tractive power comprising in combination a wheel, headed elements fixed on one side thereof spaced concentrically of the wheel, the heads of said last named elements being positioned with a space inwardly thereof, a windlass drum having a securing flange provided with securing slots, each slot having a central enlarged receiving portion adapted to engage freely over the headed elements singly, the enlargements of the slots being spaced to register simultaneously with the headed elements, each slot including also two reduced extensions concentric with the wheel and adapted to engage closely under the heads under relative rotation of the drum, whereby the drum may be positioned by manual presentation of the flange over the headed members and held secured under resistance of a rope or the like being wound thereon by rotation of the wheel in either direction.

2. A device for adapting motor vehicle wheels to exert a force in excess of their tractive power, comprising in combination a drum member having slots therein each formed with an enlarged entrance portion and a concentric reduced branch on each side, a wheel and means carried by the wheel constructed and adapted for simultaneous entrance into the entrance portions of the slots and being of a size to enter respective branches of the slots under relative rotation of the drum member, and engage against lateral movement of the drum.

3. As an improved article of manufacture for the purposes described, a peripherally channeled drum member constructed and adapted to engage clear over a hub cap and including an integral portion having a plurality of concentrically spaced slots each having a central enlarged portion and reduced opposite ends concentric with the channel, whereby the article may be presented under movement longitudinally of its axis to receive wheel-carried headed members through the enlargements of the slots and to receive reduced portions of the headed members in the said ends of the slots under rotative movement relatively to the headed members.

4. A device of the class described comprising a wheel having a plurality of headed members projecting laterally therefrom spaced concentrically around and in parallel to the axis of the wheel, a windlass member including a barrel and a flange head at the inner end thereof, said flange having a plurality of slots curved concentrically and having central enlargements spaced correspondingly to the headed members on the wheel, for the purpose described.

5. A device of the class described comprising in combination a wheel including opposed clamping hub flanges and spokes held therebetween, wheel-assembling bolt members coengaged through the flanges, certain of said bolts having outwardly disposed enlarged heads, means for spacing the heads of the last named bolts outwardly of the adjacent flange, means for securing the bolts, said certain bolts being concentrically and equally spaced in the wheel, a drum member having a plate adapted to lie closely parallel to the outer flange provided with concentrically equally spaced slots said slots being elongated and curved concentrically, each slot being provided with a central circular enlargement, the enlargements being spaced for simultaneous engagement over the heads of the bolts, as and for the purpose described.

6. A device of the class described comprising, a drum having means adapted to engage the hub of a vehicle wheel, said drum having an inclosure formed at the end to be secured to the wheel, said end having a plurality of openings each having a central enlargement and end portions; and a plurality of locking members on the wheel each having a reinforcement projecting from the wheel and a head on said reinforcement, said members being so proportioned that said heads thereof pass through said central enlargement of said openings into said inclosure and the enlargements adjacent said heads fit into said end portions of said openings in said end of said drum.

7. In a device of the character described a wheel having a plurality of laterally projected headed members concentrically spaced, a drum constructed with portions to pass freely around said headed members and having parts on said portions to lie between each two mutually adjacent headed members constructed to engage under the heads of said members respectively upon rotation of the drum in either direction.

In testimony whereof I have hereunto set my hand in presence of two subscribing witnesses.

LEONARD O. PILLSBURY.

Witnesses:
CLINTON G. MURRAY,
Mrs. A. E. CARLTON.